United States Patent
Hutchins et al.

(10) Patent No.: US 10,601,293 B2
(45) Date of Patent: Mar. 24, 2020

(54) HIGHLY EFFICIENT LINEAR MOTOR

(71) Applicant: Sentimetal Journey Inc., South San Francisco, CA (US)

(72) Inventors: Richard H. Hutchins, South San Francisco, CA (US); Joseph Scott Rust, Los Gatos, CA (US)

(73) Assignee: SentiMetal Journey, LLC, Las Vegas, NV (US)

( * ) Notice: Subject to any disclaimer, the term of this patent is extended or adjusted under 35 U.S.C. 154(b) by 0 days.

(21) Appl. No.: 16/370,576

(22) Filed: Mar. 29, 2019

(65) Prior Publication Data

US 2019/0267883 A1    Aug. 29, 2019

Related U.S. Application Data

(63) Continuation-in-part of application No. 15/947,131, filed on Apr. 6, 2018.
(Continued)

(51) Int. Cl.
| | | |
|---|---|---|
| *H02K 41/02* | (2006.01) | |
| *H02K 35/06* | (2006.01) | |

(Continued)

(52) U.S. Cl.
CPC .............. *H02K 35/06* (2013.01); *H02K 1/06* (2013.01); *H02K 5/08* (2013.01); *H02K 41/031* (2013.01); *H02K 2201/12* (2013.01)

(58) Field of Classification Search
CPC ........ H02K 41/031; H02K 41/03; H02K 5/08; H02K 5/06; H02K 1/06; H02K 2201/12
See application file for complete search history.

(56) References Cited

U.S. PATENT DOCUMENTS

| | | |
|---|---|---|
| 2,411,734 A | 11/1946 | Kerwin |
| 4,794,890 A | 1/1989 | Richeson, Jr. |

(Continued)

FOREIGN PATENT DOCUMENTS

| | | |
|---|---|---|
| JP | 2000-199411 | 2/2000 |
| JP | 2001-008432 A | 1/2001 |

(Continued)

OTHER PUBLICATIONS

Search Report and Written Opinion for PCT/US2014/049953, dated Feb. 10, 2015, Applicant, SentiMetal Journey LLC (16 pages).
(Continued)

*Primary Examiner* — Zelalem Eshete
(74) *Attorney, Agent, or Firm* — Rosenbaum IP, P.C.

(57) ABSTRACT

An electrical system including a linear motor in which energized forcer and thruster coils are used for the field and armature elements. In accordance with exemplary embodiments, one or more thruster coils may be provided on a shaft with opposing single or multiple fixed forcer coils. Using coils as the electromagnets for forcer and thruster coils advantageously provides necessary power while also minimizing system weight and decreases in magnetism typically encountered with permanent magnets with rising temperature, resulting in higher and more controllable magnetic forces over varying temperatures. Ferrous elements, such as a ferrous system housing and/or open ferrous containers for the thruster coils may be further included to advantageously focus the magnetic forces. Additionally, multiple forcer and thruster coils may be disposed in various arrangements along the shaft. Exemplary applications include use of such a system for controlling oscillations of a poppet valve in an internal combustion engine.

38 Claims, 16 Drawing Sheets

Related U.S. Application Data

(60) Provisional application No. 62/634,592, filed on Feb. 23, 2018.

(51) Int. Cl.
*H02K 41/03* (2006.01)
*H02K 5/08* (2006.01)
*H02K 1/06* (2006.01)

(56) References Cited

U.S. PATENT DOCUMENTS

| | | | |
|---|---|---|---|
| 5,188,336 A | 2/1993 | Graner et al. | |
| 5,572,961 A | 11/1996 | Sschechter et al. | |
| 5,598,814 A | 2/1997 | Schroeder et al. | |
| 5,692,463 A * | 12/1997 | Liang | F01L 9/04 123/90.11 |
| 5,873,335 A | 2/1999 | Wright et al. | |
| 5,983,847 A | 11/1999 | Miyoshi et al. | |
| 6,047,672 A | 4/2000 | Hanai et al. | |
| 6,247,431 B1 | 6/2001 | Toriumi | |
| 6,293,303 B1 | 9/2001 | Mori et al. | |
| 6,318,312 B1 | 11/2001 | Bauer et al. | |
| 6,321,701 B1 | 11/2001 | Vorih et al. | |
| 6,390,443 B1 | 5/2002 | Katayama et al. | |
| 6,397,797 B1 | 6/2002 | Kolmanovsky et al. | |
| 6,666,178 B1 | 12/2003 | Keller et al. | |
| 6,729,279 B1 | 5/2004 | Lundqvist et al. | |
| 6,736,092 B2 | 5/2004 | Borean et al. | |
| 7,047,919 B2 | 5/2006 | Morin et al. | |
| 7,225,770 B2 | 6/2007 | Simpson | |
| 7,392,774 B2 | 7/2008 | Magner et al. | |
| 7,869,929 B2 | 1/2011 | Sugihara | |
| 7,878,480 B2 | 2/2011 | Vattaneo et al. | |
| 8,056,541 B1 | 11/2011 | Nick | |
| 8,087,392 B2 | 1/2012 | Swanbon et al. | |
| 8,374,769 B2 | 2/2013 | Moriya | |
| 8,402,742 B2 | 3/2013 | Tripathi et al. | |
| 8,402,942 B2 | 3/2013 | Tripathi et al. | |
| 2002/0145124 A1 | 10/2002 | Kabasin et al. | |
| 2003/0168030 A1 | 9/2003 | Muraji | |
| 2004/0031455 A1 | 2/2004 | Muraji | |
| 2004/0113731 A1 | 6/2004 | Moyer et al. | |
| 2005/0016478 A1 | 1/2005 | Mizuta | |
| 2005/0126521 A1 | 6/2005 | Simpson | |
| 2006/0213467 A1 | 9/2006 | Roeschle et al. | |
| 2007/0044741 A1 | 3/2007 | Daniel | |
| 2007/0295291 A1 | 12/2007 | Uercho | |
| 2011/0234210 A1 | 9/2011 | Hayashi et al. | |
| 2012/0167849 A1 | 7/2012 | Hutchins et al. | |
| 2012/0291727 A1 | 11/2012 | Keller et al. | |
| 2013/0098337 A1 | 4/2013 | Carlson et al. | |
| 2017/0321620 A1 | 11/2017 | Hutchins | |

FOREIGN PATENT DOCUMENTS

| | | |
|---|---|---|
| JP | 2004-120815 A | 4/2004 |
| JP | 2009-002666 A | 1/2009 |
| JP | 2012-175851 A | 9/2012 |
| SE | 534436 | 8/2011 |

OTHER PUBLICATIONS

Baldor, "Servo, Linear & Motion Control Products Catalog" [online], Apr. 28, 2011, Retrieved from the Internet Archive: htt1r// stevenengineering.com/Tech.sub--Suooort/PDFs/92SERVO.sub-- LINEAR-.sub.--Motion.pdf, (56 pages).

MD Forhad Khandaker, Voice Coil Actuated Variable Valve Timing System for Spark Ignition Engines, Mar. 2006, Concordia University, Montreal Quebec Canada, Department of Mechanical and Industrial Engineering, (171 pages).

Autozine Technical School, Continuous Variable Valve Lift (CVVL), httQ ://www.autozine.org/technical. sub. --school/engine/vvt. sub. --5 .html, Jan. 1, 1997.

Edgar, Julian, BMW's Valvetronic? The first petrol engine without a throttle butterfly? http://www.autosoeed.com/cms/A.sub.--I11539/ article.html Jan. 1, 2001, (2 pages).

European Patent Office Communication pursuant to Article 94(3) dated Mar. 27, 2018, for European Application No. 14834447.6 1007, Applicant, SentiMetal Journey LLC (4 pages).

Wikipedia article on linear motors: https://en.wikipedia.org/wiki/ Linear _ motor; printed from the internet on Jan. 23, 2018 (7 pages).

Lin Mot®, a vendor of PM vs coil linear motors: htt12://www. linmot.com/12roducts/linear-motors/; printed from the internet on Jan. 23, 2018 (5 pages).

Kollmorgen, John Floresta, Oct. 1, 2000; MachineDesign®: htt12:// www.machinedesign.com/linear-motion/driving-linear-motors; printed from the internet on Jan. 23, 2018 (7 pages).

http://www.moticont.com/voice-coil-motor.htm; printed from the Internet on Jan. 23, 2018 (1 page).

© 2016 BEi Kimco, htt12://www.beikimco.com/resources-downloads/ about-VCAs/what-is-a-voice-coil-actuator, printed from the internet on Jan. 23, 2018 (3 pages).

htt12://www.beikimco.com/motor-12roducts/VCA-linear-voice-coil- actuator-all; printed from the internet on Jan. 23, 2018, (2 pages).

Wikipedia article on linear induction motor: htt12s://en.wiki12edia. org/wiki/Linear induction motor; printed from the internet on Jan. 23, 2018 (2 pages).

© 1994-2018 Aerotech, Inc., htt12s://www.aerotech.com/12roduct- catalog/motors/linear-motor.asox: printed from the internet on Jan. 23, 2018, (4 pages).

© Copyright 2013 Kollmorgen; htt12s://www.kollmorgen.com/en- us/12roducts/motors/direct-drive/direct-drive-linear/; printed from the internet on Jan. 23, 2018 (1 page).

Maccon; htt12s://www.maccon.de/en/linear-motors.html; printed from the internet on Jan. 23, 2018, (1 page).

Barrett, Jack et al., Parker Hannifin Corporation, "Linear Motor Basics", printed from the internet on Jan. 23, 2018, (8 pages).

Japanese Office Action for JP Application No. 2016-533402, with English translation, dated Jun. 28, 2018, Applicant, SentiMetal Journey, LLC, (6 pages).

Japanese Office Action for JP Application No. 2016-533402, dated Jun. 28, 2018, Applicant, SentiMetal Journey, LLC, (13 pages).

https://newatlas.com/camcon-digital-rva-valve-system/558277? utm medium=email&utm cam12aign=2018-08-13%20143 3 00% 20USA%20Daily%20Basic%202018-08-13%20143956%20Worlds% 20first%20fully%20digital%20valves%20012en%20u12%20 engine% 2012ossibilities&utm content=2018-08-13%20 I 43300%20USA %20Daily%20Basic%202018-08-13%20143956%20Worlds%20first% 20fully%20digital%20valves%20012en%20u12%20 engine% 2012ossibilities+CID c363d546d8b28da88e5b649db646bb5c&utm source=Ca m12aign%20Monitor, New Atlas, "World's first fully digital valves open up engme possibilities," Printed from the internet Aug. 11, 2018 (12 pages).

Chang, W.S., et al., "A New Electromagnetic Valve Actuator," Massachusetts Institute of Technology, Laboratory for Electronic and Electromagnetic Systems, Oct. 24, 2002, (10 pages).

Liu, Jieng-Jang et al., "Electromechanical Valve Actuator with Hybrid MMF for Camless Engine," Proceedings of the 17th World Congress, The International Federation of Automatic Control, Seoul, KR, Jul. 6-11, 2008, Department of Mechanical Engineering, National Taiwan University, Taiwan, pp. 10698-10703, (6 pages).

"Electromechanical Valve Actuator for Variable Valve Timing," updated Jul. 20, 2014, httQ ://www.launch12nt. com/12ortfoli o/trans12ortati on/ electromechanical-valve-actuator, © 2017 LaunchPoint Technologies Inc., Magnetic Moments™ Academic Products, (9 pages).

Wikipedia, "Camless Piston Engine," Printed from the internet on Jun. 1, 2008, httos://en.wikioedia.orn/wiki/Camlesspiston engine, (9 pages).

Lin Mot®, http://www.linmot.com/products/linear-motors/; printed from the internet on Jan. 23, 2018, (5 pages).

Kollmorgen, John Floresta, Oct. 1, 2000; MachineDesign®: http:// www.machinedesi gn. com/linear-motion/driving-linear-motors; printed from the internet on Jan. 23, 2018 (7 Pages).

http://www.moticont.com/voice-coil-motor.htm; printed from the internet on Jan. 23, 2018, (I page).

(56) References Cited

OTHER PUBLICATIONS

© 2016 BEI Kimco, http://www.beikimco.com/resources-downloads/about-VCAs/what-is-a-voice-coil-actuator, printed from the internet on Jan. 23, 2018, (3 pages).
http://www.beikimco.com/motor-products/VCA-linear-voice-coil-actuator-all; printed from the internet on Jan. 23, 2018, (2 pages).
Wikipedia article on linear induction motor: https://en.wikipedia.org/wiki/Linear induction motor; printed from the internet on Jan. 23, 2018, (5 pages).
© 1994-2018 Aerotech, Inc., https://www.aerotech.com/product-catalog/motors/linear-motor.asox—minted from the internet on Jan. 23, 2018, (4 pages).
© Copyright 2013 Kollmorgen; https://www.kollmorgen.com/en-us/products/motors/direct-drive/direct-drive-linear/; printed from the Internet on Jan. 23, 2018, (I page).
Maccon; https://www.maccon.de/en/linear-motors.html; printed from the internet on Jan. 23, 2018, (I page).

\* cited by examiner

HIGHLY EFFICIENT LINEAR MOTOR

RELATED APPLICATIONS

This application is a continuation-in-part of and claims priority from U.S. patent application Ser. No. 15/947,131, entitled "Highly Efficient Linear Motor" and filed on 6 Apr. 2018, the contents of which are incorporated herein by reference, and further claims priority from U.S. Patent Application 62/634,592, entitled "Highly Efficient Linear Motor" and filed on 23 Feb. 2018, the contents of which are incorporated herein by reference.

FIELD

The present invention relates generally to linear motors and control systems therefor for various applications.

BACKGROUND

Many types of linear motors are currently made for many different applications. There are two basic types of linear motors, circular and flat. Circular motors include, voice coil motors, voice coil actuators, and linear motors—sometimes called tubular motors, and are generally used for high force, small distance motors. Circular motors generally use a central member that would be an armature in a rotary motor and an outer member that surrounds the central member and would be a field in a rotary motor. The armature of the rotary motor is the thruster in a linear motor and the field of the rotary motor is the forcer. Flat linear motors are linear motors that are laid out flat, with coils and magnets alongside each other, with linear bearings that constrain the moving member and are generally used for intermediate distance movement. This flat type of linear motor can include electromagnets on both the moving and stationary side, as recited in published US Patent Application 2017/0047821 A1. Flat linear motors include linear induction motors, which are well known with the widest use in mass transit trains over long distances, sometimes with magnetic levitation. These have been known for quite a while as evidenced by U.S. Pat. No. 782,312 which was granted on Feb. 14, 1905 for a magnetic levitation application. Linear synchronous motors are also used for mass transit trains and may use electro magnets for both the fixed magnet and the moving magnet with both driven by multi-phase synchronized electronic drive systems.

Today's linear motors utilized for rapid movements from fractional distances to several inches, generally use one or more coils, one or more permanent magnets and a control system that delivers power to the coil(s) to control movement of the linear motor. Current efforts to improve the power and electrical efficiency of small distance, high speed, linear motors has involved the use of more and more powerful permanent magnets, typically using rare earths such as neodymium. These rare earth permanent magnets are quite strong but very expensive and if subjected to heat, see decreases in their strength proportional to the increased heat, as do all permanent magnets. The decrease in strength at elevated temperature hampers the use of linear motors in some applications, such as in internal combustion engines (ICEs). The decrease in magnetic strength with elevated temperature varies from magnet to magnet, additionally decreasing with increasing temperature at slightly varying rates from magnet to magnet, resulting in a change that cannot be compensated for by standard equations.

Due to the deficiencies of these prior attempts, there remains the need to provide an efficient linear motor that can operate at elevated temperatures. The improved linear motor presented here can serve in many applications while subject to elevated temperatures, including in actuation systems for the poppet valves of an ICE that reduce cost, weight and complexity, while providing for fully independent control of the valve actuation parameters.

SUMMARY

An electrical system including a linear motor in which energized forcer and thruster coils are used for the field and armature elements. In accordance with exemplary embodiments, one or more thruster coils may be provided on a shaft with opposing single or multiple fixed forcer coils. Using coils as the electromagnets for forcer and thruster coils advantageously provides necessary power while also minimizing system weight and decreases in magnetism typically encountered with permanent magnets with rising temperature, resulting in higher and more controllable magnetic forces over varying temperatures. Ferrous elements, such as a ferrous system housing and/or open ferrous containers for the thruster coils, may be further included to advantageously focus the magnetic forces. Additionally, multiple forcer and thruster coils may be disposed in various arrangements along the shaft. Exemplary applications include use of such a system for controlling oscillations of a poppet valve in an internal combustion engine.

In accordance with exemplary embodiments, a linear motor includes: a shaft member having a longitudinal axis and opposing first and second shaft ends; at least one thruster coil disposed coaxially about and affixed to a portion of the shaft member between the opposing first and second shaft ends; at least one forcer coil disposed coaxially about another portion of the shaft member and outside an outer periphery of the thruster coil; and a gap between the thruster coil and the forcer coil.

In accordance with further exemplary embodiments, a linear motor includes: a shaft member having a longitudinal axis and opposing first and second shaft ends; an open coil support member including a first support portion disposed coaxially about at least a portion of the shaft member, and a second support portion attached to the shaft member; at least one thruster coil disposed coaxially about and affixed to the first support portion; at least one forcer coil disposed coaxially about another portion of the shaft member and at least partially inside at least a portion of an inner periphery of the thruster coil; and a gap between the thruster coil and the forcer coil.

In accordance with exemplary embodiments, a method for driving a linear motor includes: applying, to at least one forcer coil disposed coaxially about at least a portion of a shaft member having a longitudinal axis and opposing first and second shaft ends, a first signal having one of first mutually opposing polarities to induce a forcer magnetic field; and applying, to at least one thruster coil disposed coaxially with and between respective portions of the forcer coil and the shaft member, a second signal having one of second mutually opposing polarities to induce a thruster magnetic field, wherein the at least one thruster coil is affixed to a portion of the shaft member between the opposing first and second shaft ends and defines a gap coaxially between the thruster coil and the forcer coil; wherein responsive to applying the first and second signals having a combination of the first and second mutually opposing polarities, the forcer and thruster magnetic fields are mutually attractive and urge the shaft member to move more of the thruster coil between respective portions of the forcer coil and the shaft member, and responsive to applying the first and second signals having a different combination of the first and second mutually opposing polarities, the forcer and thruster magnetic fields are mutually repellant and urge the shaft member to move more of the thruster coil out from between respective portions of the forcer coil and the shaft member.

In accordance with further exemplary embodiments, a method for driving a linear motor includes: applying, to at least one forcer coil disposed coaxially about at least a portion of a shaft member that includes a longitudinal axis and opposing first and second shaft ends and is attached to a first support portion of an open coil support member, a first signal having one of first mutually opposing polarities to induce a forcer magnetic field; and applying, to at least one thruster coil disposed coaxially about and affixed to a second support portion of the open coil support member and disposed coaxially about at least another portion of the shaft member, a second signal having one of second mutually opposing polarities to induce a thruster magnetic field, wherein the at least one forcer coil is further disposed at least partially inside at least a portion of an inner periphery of the thruster coil; wherein responsive to applying the first and second signals having a combination of the first and second mutually opposing polarities, the forcer and thruster magnetic fields are mutually attractive and urge the shaft member to cause more of the at least one forcer coil to be disposed inside the inner periphery of the thruster coil, and responsive to applying the first and second signals having a different combination of the first and second mutually opposing polarities, the forcer and thruster magnetic fields are mutually repellant and urge the shaft member to cause less of the at least one forcer coil to be disposed inside the inner periphery of the thruster coil.

DETAILED DESCRIPTION

Figure 1:
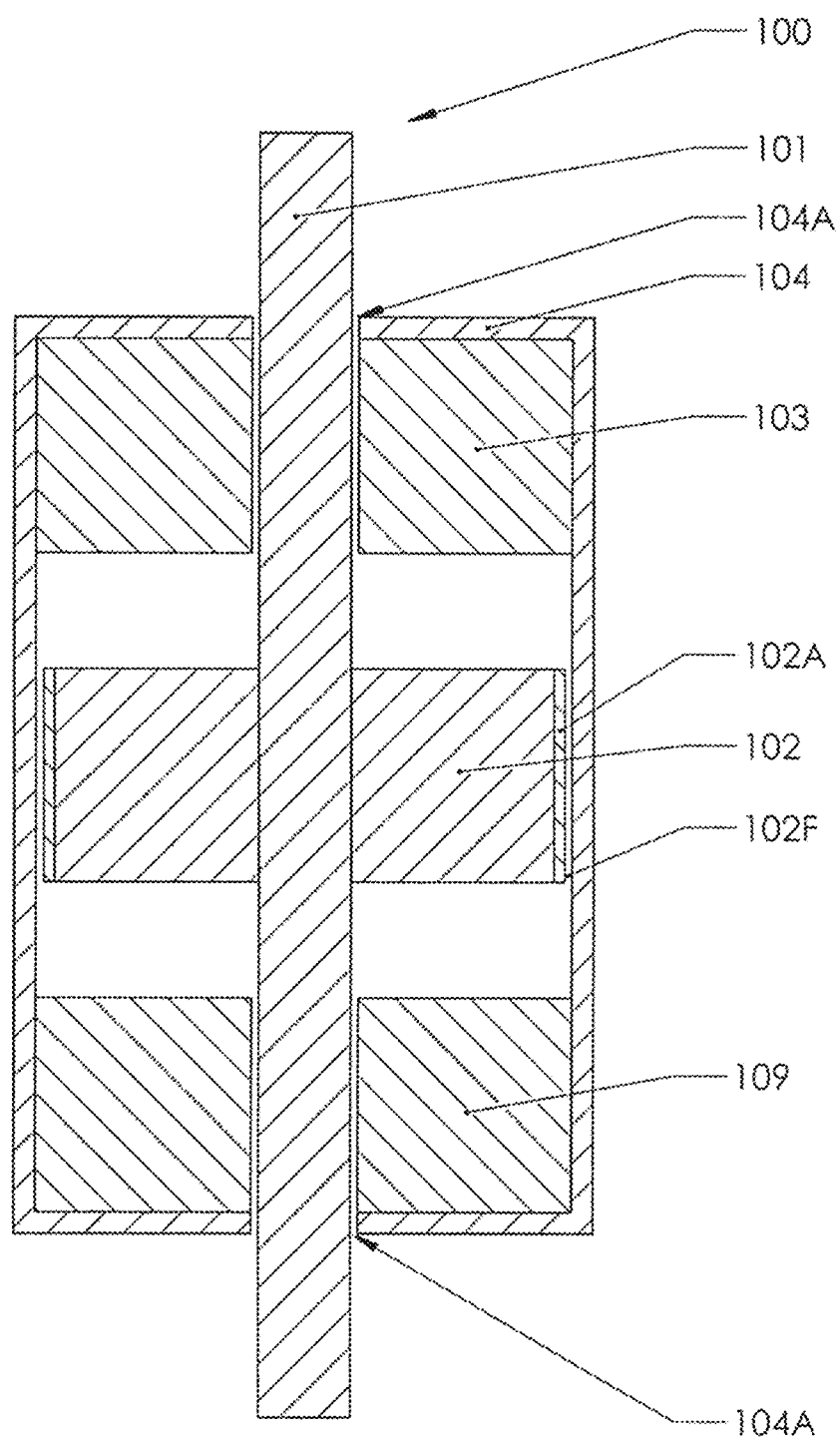
FIG. 1 is a cross sectional side view of a linear motor in accordance with exemplary embodiments.

As discussed in more detail below, deficiencies discussed above are addressed by providing for an improved linear motor and method of operation that have many applications, including a system for actuating valves in an ICE using such a linear motor to variably control the movement of a valve with a high degree of accuracy and speed. Linear motors will be understood by those of ordinary skill in the art to include voice coil motors with fixed coils, moving coils, fixed magnets and moving magnets, single and multiple coils, single and multiple magnets, linear motors—sometimes called linear actuators, using multiple coils and multiple magnets and other types of linear motors, and linear motors that include sets of coils and/or magnets laid out linearly next to each other. The moving magnetic part in a linear motor is referred to as the thruster and the fixed magnetic part is referred to as the forcer.

In the following descriptions, the present invention will be explained with reference to various example embodiments; nevertheless, these embodiments are not intended to limit the present invention to any specific example, environment, application, or particular implementation described herein. Therefore, descriptions of these example embodiments are only provided for purpose of illustration rather than to limit the present invention. The linear motor of the present invention can be configured to operate in many different applications, including controlling the valves of an internal combustion engine (ICE). This linear motor may be more powerful and more easily controlled than previous linear motors of comparable size(s) and may operate in many applications that previously required gear motors or other forms of torque multiplier actuators.

The linear motor of the present invention has tremendous advantages over gear motors and other torque multiplier mechanisms because the linear motor has no backlash and needs no gear drives that can break or strip due to wear and overstress or require occasional lubrication. When the linear motor of the present invention is overstressed it will simply hold steady—or even be pushed in one direction or the other, but if properly electrically controlled and protected, will resume control after the overstress is removed—without any damage to the linear motor or loss of ability to control the apparatus. The higher power of the present invention linear motor allows its use in higher speed and higher power applications with greater accuracy to ideal performance. The present invention linear motor can be driven by a dedicated Electronic Control Unit (ECU) that contains the rules, algorithms and/or look-up tables of the application, by an overall controller which controls other aspects of the application, or by any combination of these needed to provide complex motion control for a wide range of applications.

The acts, modules, logic and method steps discussed herein below, according to certain embodiments of the present invention, may take the form of a computer program or software code stored in a tangible machine-readable medium (or memory) in communication with a control unit, comprising a processor and memory, which executes the code to perform the described behavior, function, features and methods. It will be recognized by one of ordinary skill in the art that these operations, structural devices, acts, logic, method steps and modules may be implemented in software, in firmware, in special purpose digital logic, and any combination thereof without deviating from the spirit and scope of the present invention as recited within the claims attached hereto.

When used in an ICE, operating according to Otto, Diesel or some variant of these cycles (e.g. Miller or Atkinson), the timing, lift, duration, and speed of the individual valves in the ICE can be varied independently from the crankshaft rotational speed and each valve independently from the actuation of any of the other valves. Thus, for example, an engine with dual intake and/or dual exhaust valves for each cylinder can have each member of the pair of valves open and close with different timing, duration, lift, and speed—or even not operate—to achieve desired engine performance throughout the entire operational speed and load range of the engine. The valve opening and closing speed can be increased as the engine speed and lift increase to maintain performance accuracy and valve opening/closing operations can also be varied during stroke(s) to control (e.g., reduce) closing and/or opening speed(s) to enhance reliability. The assembly and system are simple, lightweight and low cost compared to prior attempts at improved valve actuation systems, as discussed herein.

Further, as discussed in more detail below, dedicated linear motors (e.g., individually designed and/or implemented for a specific application) may omit a housing in which most or all motor elements are contained. For example, such motors may be considered as a constituent component of the host system or machine that they serve and, therefore, be mounted directly with an aperture, bearing or other mounting device adequate to movably stabilize the central shaft within the mounting surface. Alternatively, linear motors may omit an enclosed housing by incorporating one or more apertures to movably stabilize the central shaft in one or more structures fixedly attached to one or more ferrous containers for the forcer coils.

Various elements and/or structures discussed herein may be described as "coupled", "connected", "attached", or "fixedly attached". As will be readily understood by those of ordinary skill in the art, such terms may be understood to include various techniques, methods, devices and/or materials suitable for securing or otherwise ensuring physical attachment, adequate for the application, of multiple elements and/or structures, and may include, without limitation, various known attachment or bonding techniques (e.g., welding, soldering, etc.), attachment or bonding materials (e.g., adhesives, etc.) and/or attachment devices (e.g., mechanical fasteners such as screws, bolts, rivets, etc.).

Additionally, coils as discussed herein may generally be two-dimensional or three-dimensional geometric shapes that are closed or at least substantially closed and thereby define an interior region. Exemplary embodiments may include coil shapes that are annular (e.g., round or oval) or polygonal (e.g., square, rectangular or other shapes defined by generally linear segments) or any other generally closed or tubular shape. Further, while coils may also be generally evenly wound with mutually parallel opposing sections, various exemplary embodiments may also include use of coils that may be curvaceous in cross-section (e.g., round or oval) or form other shapes in which some or all sections are mutually non-parallel.

Further, as discussed in more detail below, the generating and controlling of various magnetic forces are discussed in terms of applying various electrical currents to conductive coils, in accordance with well-known principles. However, as will be readily appreciated by those skilled in the art, conduction of a current generally produces a corresponding voltage across the conducting element or media. Similarly, application of a voltage across such conducting element or media generally produces a corresponding current flowing through such conducting element or media. Accordingly, and as may be used in the discussion and/or claims below, the term "signal" may be used to refer to one or more currents, one or more voltages, or a data signal.

Referring to FIG. 1, a diagram is provided to illustrate the components of the present invention linear motor 100 according to exemplary embodiments. The central shaft 101 of the linear motor may be made of non-ferrous material, have a thruster coil 102 fixedly attached to it and reciprocate through apertures 104A in opposing ends of an optional housing 104, a fixed upper forcer coil 103 and a fixed lower forcer coil 109. If used, the housing 104 may be made of ferrous material to guide (e.g., focus or confine) magnetic fields produced by the upper 103 and a lower 109 forcer coils within the interior of the housing 104. The thruster coil 102 may be a single coil that is circumferentially shrouded with a ferrous sleeve 102A (to guide the magnetic field produced by the thruster coil 102 within the interior of the housing 104) with a gap 102F between the exterior of the ferrous sleeve 102A and the interior surface of the housing 104. The upper 103 and lower 109 forcer coils are shown as single coils for simplicity but may each be implemented using multiple coils that may be driven independently of each other. Bearings or bushings may be affixed within the housing apertures 104A to center and align the central shaft 101 but are omitted here for clarity.

Figure 1A:
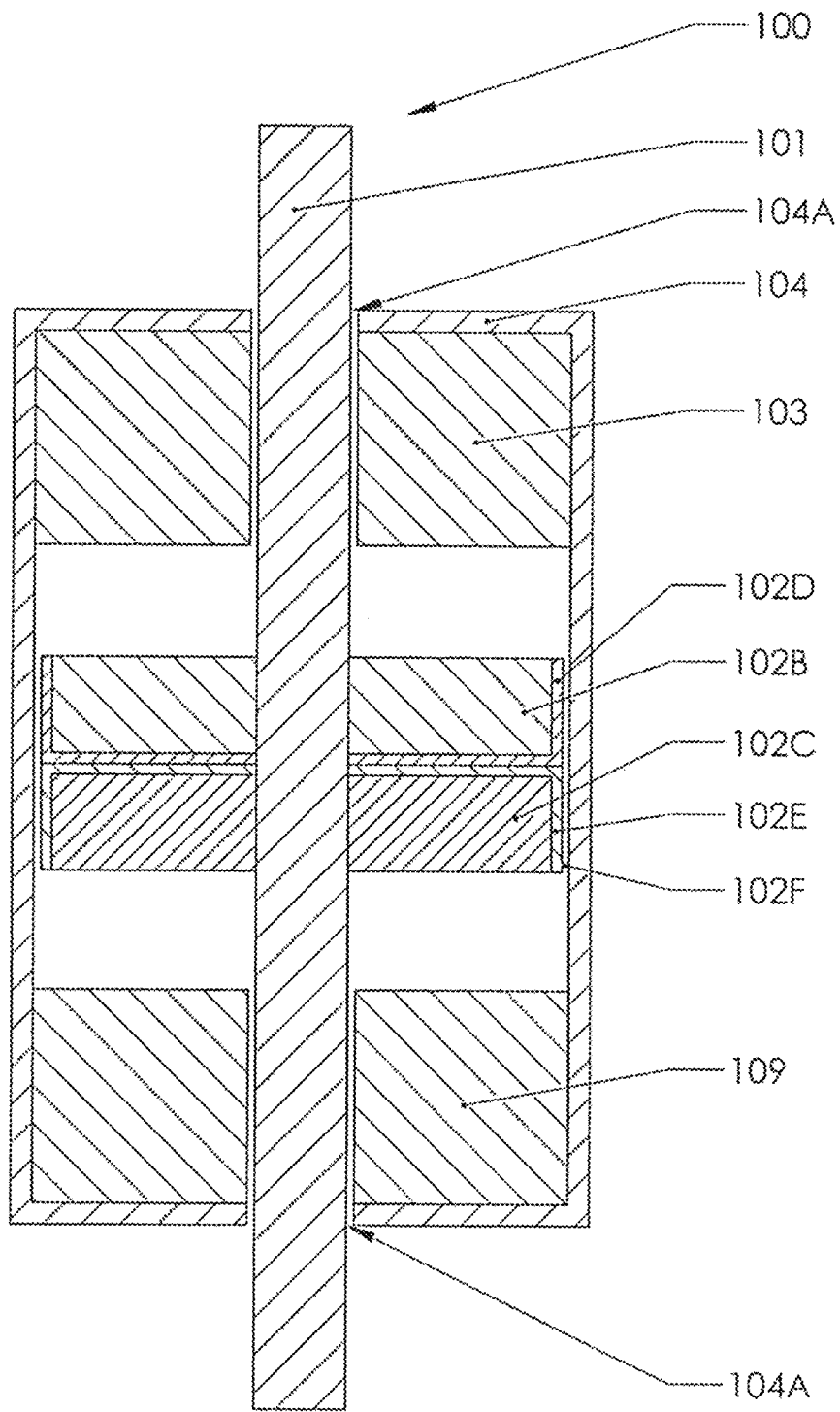
FIG. 1A is a cross sectional side view of a second linear motor in accordance with exemplary embodiments.

Referring to FIG. 1A, alternative exemplary embodiments of a linear motor 100 may include a thruster coil embodied as two coils 102B, 102C, with each in a respective ferrous cup 102D, 102E, with the cup openings facing away from each other, and each facing toward the nearest forcer coil 103, 109, with the thruster coils 102B, 102C and cups 102D, 102E fixedly attached to the central shaft 101 and with the thruster coils 102B, 102C wound such that they may be electrically connected in parallel so as to attract each other when energized. Bearings or bushings may be affixed to the housing apertures 104A to center and align the central shaft 101 but are omitted for clarity.

Figure 2:
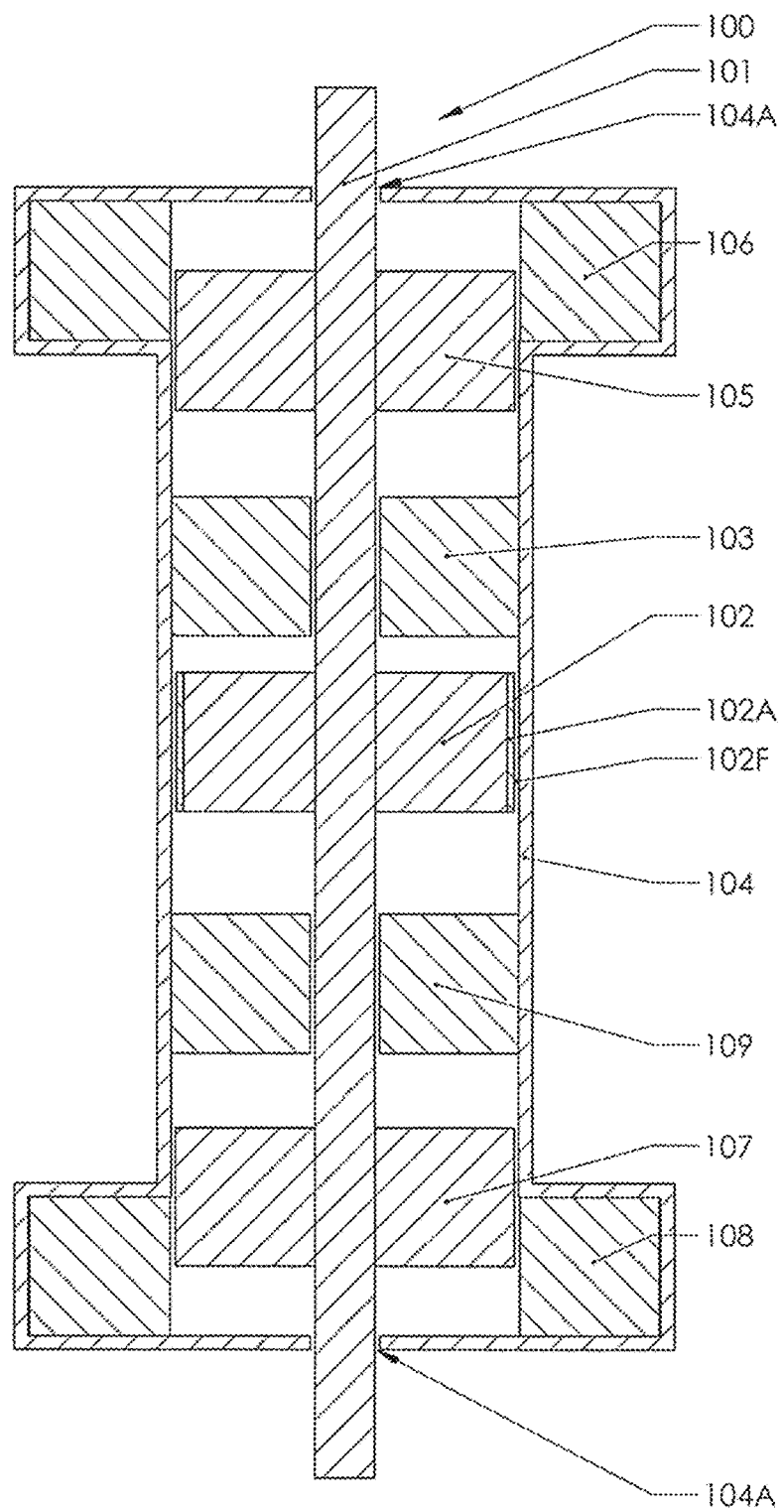
FIG. 2 is a cross sectional side view of a third linear motor in accordance with exemplary embodiments.

Referring to FIG. 2, further alternative exemplary embodiments may include additional stationary forcer coils 106, 108 fixed to the housing 104 and additional thruster coils 105, 107 fixedly attached to the central shaft 101 to hold the linear motor 100 at either of the two fully extended positions, referred to as "open" and "closed" for differentiation. For example, the upper forcer coil 106 and thruster coil 105 can hold the central shaft 101 in the upper, or closed, position, while the lower forcer coil 108 and thruster coil 107 can hold the central shaft 101 in the lower, or open, position. These additional hold-open 108, 107 or hold-closed 106, 105 coil sets need not have the power of the primary forcer coils 103, 109 and thruster coil(s) 102, since they are intended to softly and precisely place the central shaft 101 in the selected end position (e.g., open or closed) and hold it there with minimal power. The words open and closed are used here only to differentiate maximum movement of the linear motor armature in one direction from maximum movement in the other direction and have no other meaning.

Figure 2A:
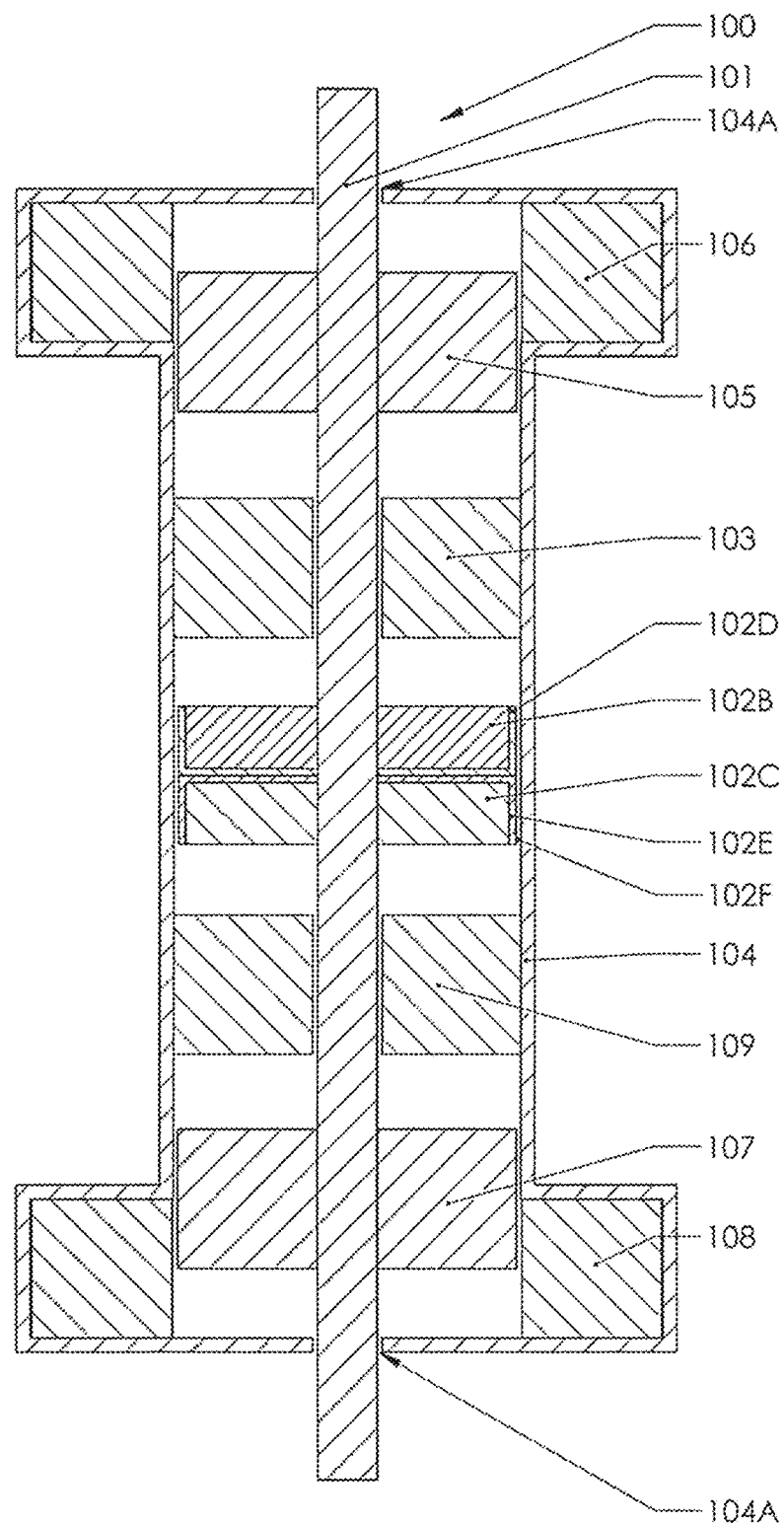
FIG. 2A is a cross sectional side view of a fourth linear motor in accordance with exemplary embodiments.

Referring to FIG. 2A, further alternative exemplary embodiments may include back-to-back thruster coils 102B, 102C and cups 102D, 102E as discussed above for FIG. 1A.

Figure 2B:
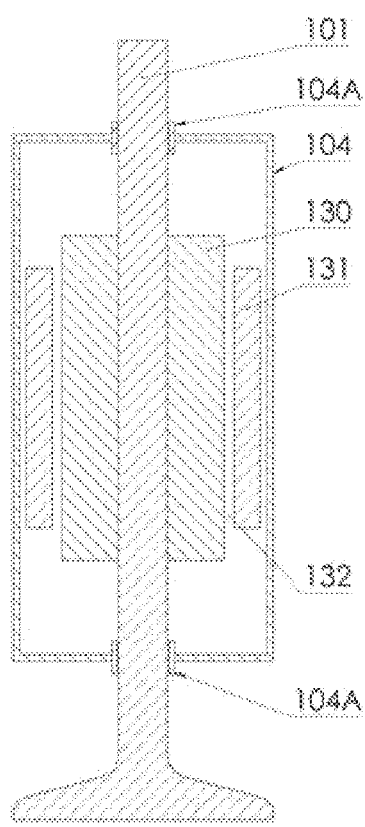
FIG. 2B is a cross sectional side view of a fifth linear motor in accordance with exemplary embodiments.

Referring to FIG. 2B, further alternative exemplary embodiments of the motor 100 may include one or more forcer coils 131 disposed coaxially about at least a portion of one or more thruster coils 130, with the latter being fixedly attached to a central shaft 101 and thereby defining a gap 132 between at least a portion of the outer periphery of the thruster coil(s) 130 and at least a portion of the inner periphery of the forcer coil(s) 131. The central shaft 101 may be of non-ferrous material. The forcer coil(s) 131 may be secured in place in a manner compatible with the application and/or operating environment of the motor 100.

For example, a housing 104 may be used to which the forcer coil(s) 131 may be fixedly attached and which may also fully or substantially contain or otherwise enclose the forcer coil(s) 131, the thruster coil(s) 130 and at least the portion of the shaft 101 to which the thruster coil(s) 130 are attached, and include apertures 104A to allow movement of extremities of the shaft 101 as the shaft 101 oscillates during motor operation. Alternatively, as will be readily apparent to one of ordinary skill in the art, various other mounting structures other than full or substantial enclosures may be used to secure the forcer coil(s) 131 and/or the motor 100 to a host system or machine (not shown) as well as provide one or more apertures 104A suitably adapted for movably stabilizing an oscillating shaft 101.

Figure 2C:
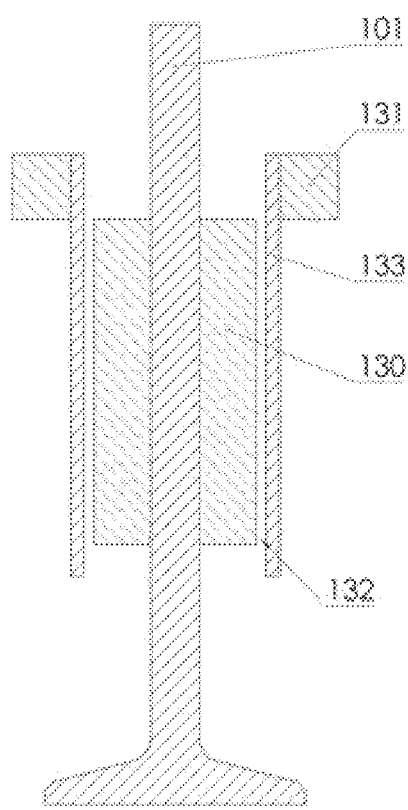
FIG. 2C is a cross sectional side view of a sixth linear motor in accordance with exemplary embodiments.

Referring to FIG. 2C, further alternative exemplary embodiments may include one or more forcer coils 131 fixedly attached to a sleeve 133 (e.g., a ferrous tubular sleeve). Together, the forcer coil(s) 131 and sleeve 133 are disposed coaxially about a central shaft 101, coaxially about which one or more thruster coils 130 may be fixedly attached, and separated by a gap 132. The forcer coil(s) 131 may also be fixedly attached to at least a portion of the outer periphery of the ferrous tubular sleeve 133. As noted above, various forms of mounting structures may be used to secure the forcer coil(s) 131 and/or the motor 100 to a host system or machine (not shown) as well as movably stabilize the oscillating shaft 101.

Figure 2D:
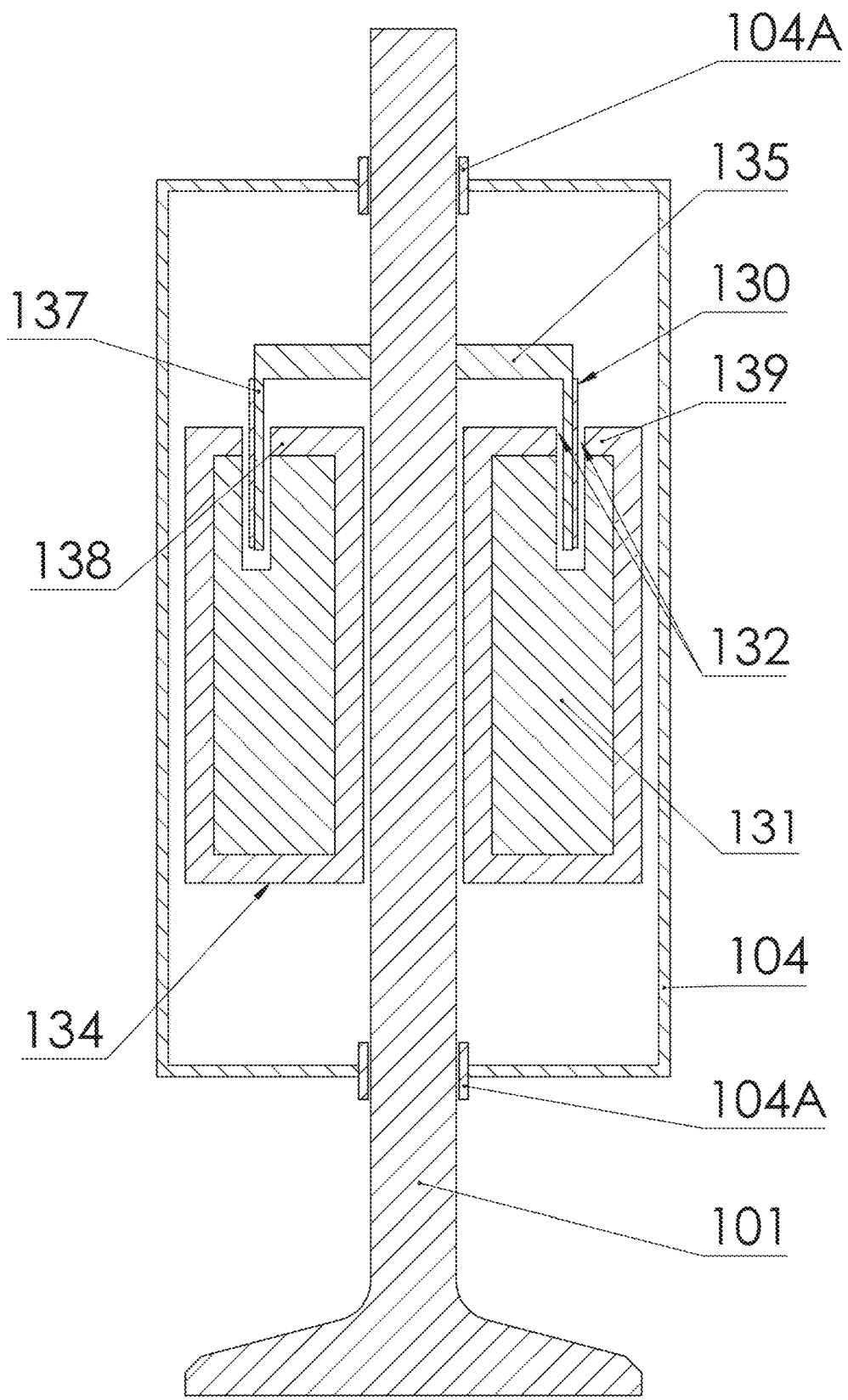
FIG. 2D is a cross sectional side view of a seventh linear motor in accordance with exemplary embodiments.

Referring to FIG. 2D, further alternative exemplary embodiments may include one or more thruster coils 130 disposed coaxially about a shaft 101. The thruster coils 130 may be wound about a non-ferrous hollow coil form 137 that may integrally include or be fixedly attached to a non-ferrous disc 135 that may, in turn, be fixedly attached to the shaft 101. One or more forcer coils 131 may be wound inside a vessel (e.g., an annular cup-like structure) 134, both of which may be disposed coaxially about the shaft 101 with an opening that allows entry and oscillation of the thruster coil(s) 130 and coil form 137, and defines gaps 132 between at least portions of the inner and outer peripheries of the thruster coil 130, inner 138 and outer 139 portions of the vessel 134, and at least a portion of an outer periphery of the forcer coil 131. As noted above, various forms of mounting structures may be used to secure the forcer coil(s) 131 and/or the motor 100 to a host system or machine (not shown) as well as movably stabilize the oscillating shaft 101. In the case of a ferrous vessel 134, its inner 138 and outer 139 portions may serve as inner 138 and outer 139 magnetic poles produced by current flow within the one or more forcer coils 131.

Figure 2E:
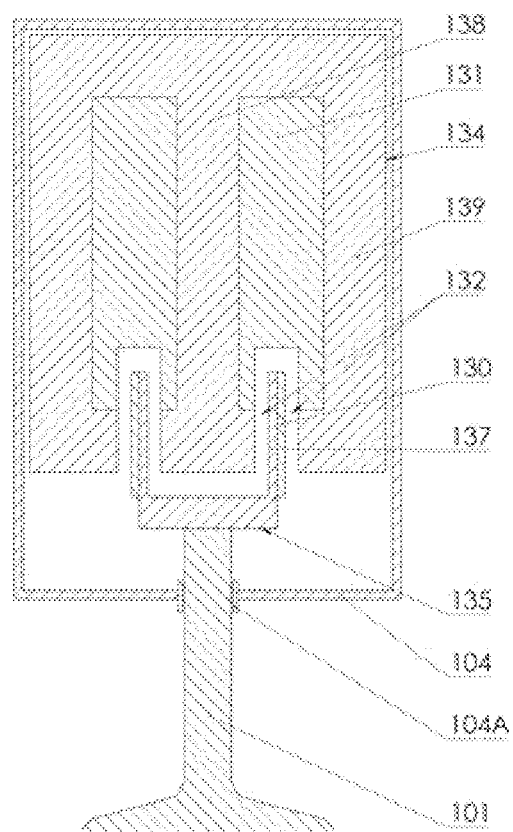
FIG. 2E is a cross sectional side view of a eighth linear motor in accordance with exemplary embodiments.

Referring to FIG. 2E, further alternative exemplary embodiments may include one or more thruster coils 130 disposed coaxially about and fixedly attached to a shaft 101 that oscillates longitudinally via an aperture 104A. The thruster coil(s) 130 may be wound on a non-ferrous coil form 137 that may integrally include or be fixedly attached to a non-ferrous disc 135 that may, in turn, be fixedly attached to the shaft 101. One or more forcer coils 131 may be wound inside a ferrous vessel 134 having an annular opening that provides gaps 136 between the thruster coil(s) 130 and the vessel 134, and allows movement and oscillation of the thruster coil(s) 130 and coil form 137. If a housing 104 is used, the vessel 134 may be fixedly attached to the housing 104. However, as noted above, various forms of mounting structures may be used to secure the forcer coil(s) 131 and/or the motor 100 to a host system or machine (not shown) as well as movably stabilize the oscillating shaft 101.

Figure 2F:
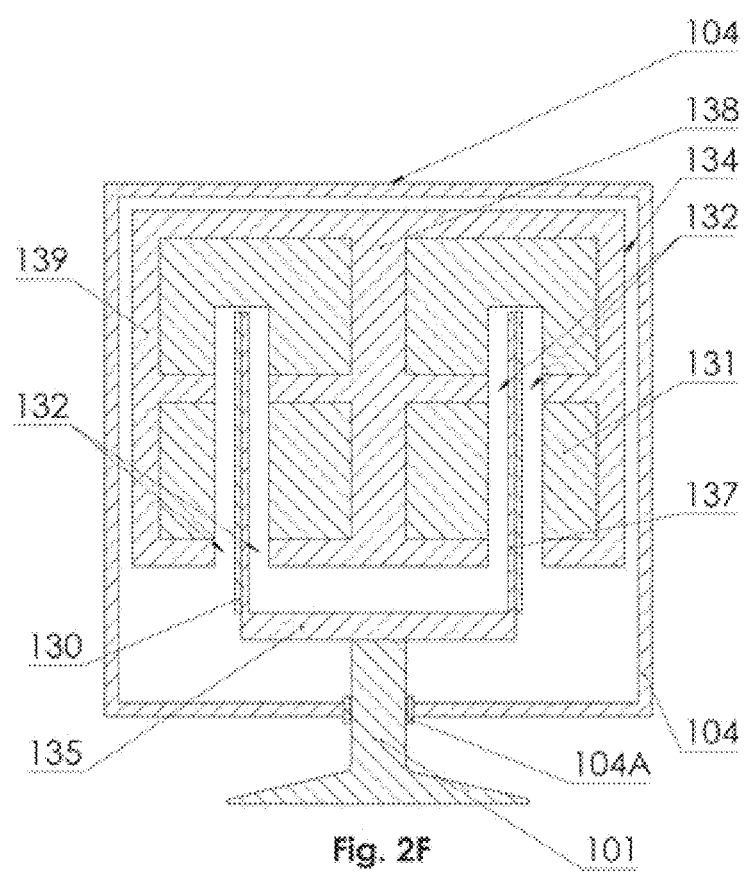
FIG. 2F is a cross sectional side view of a ninth linear motor in accordance with exemplary embodiments.

Referring to FIG. 2F, further alternative exemplary embodiments may include one or more thruster coils 130 disposed coaxially about and fixedly attached to a shaft 101 that oscillates longitudinally via an aperture 104A. The thruster coil(s) 130 may be wound on a non-ferrous hollow coil form 137 that may integrally include or be fixedly attached to a non-ferrous disc 135 that may, in turn, be fixedly attached to the shaft 101. One or more forcer coils 131 may be wound inside a ferrous vessel 134 having an annular opening that provides gaps 136 between the thruster coil(s) 130 and the vessel 134, and allows movement and oscillation of the thruster coil(s) 130 and coil form 137. If a housing 104 is used, the vessel 134 may be fixedly attached to the housing 104. However, as noted above, various forms of mounting structures may be used to secure the forcer coil(s) 131 and/or the motor 100 to a host system or machine (not shown) as well as movably stabilize the oscillating shaft 101.

Figure 3:
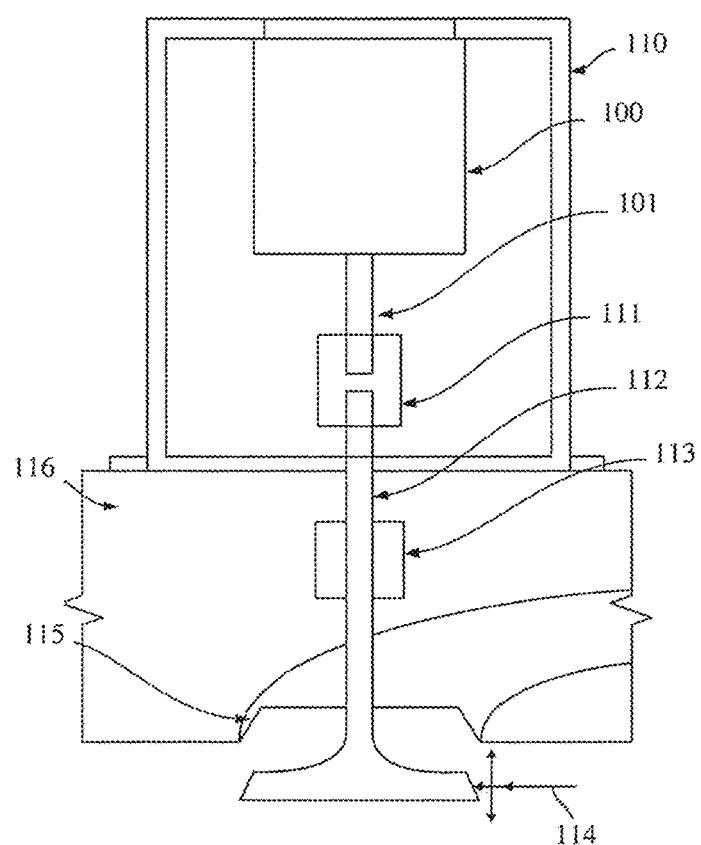
FIG. 3 is a cross sectional side view of an internal combustion engine valve connected to a linear motor in accordance with exemplary embodiments.

Referring to FIG. 3, further alternative exemplary embodiments may include connection to the valve stem of an ICE. Alternatively, such embodiments may be built around the valve stem of an ICE. For example, the linear motor 100 of FIG. 1, 1A, 2 or 2A may be attached to an outer housing 110 which is itself attached to the ICE head 116, with the central shaft 101 of the linear motor 100 affixed via a coupling 111 to the valve stem 112 of the ICE to oscillate the valve head 114 from closed on the valve seat 115 in the ICE head 116 to fully open and all positions in between. A serviceable valve guide 113 may be fixed in the ICE head 116 to precisely position the ICE valve stem 112.

As discussed hereinabove, the shaft of the linear motor may be a reciprocating shaft configured to oscillate in accordance with magnetic forces imposed upon its thruster coil by a forcer coil. However, in accordance with further exemplary embodiments, the central shaft and its (inner) coil may be held in a fixed position as an outer coil assembly reciprocates.

Figure 3A:
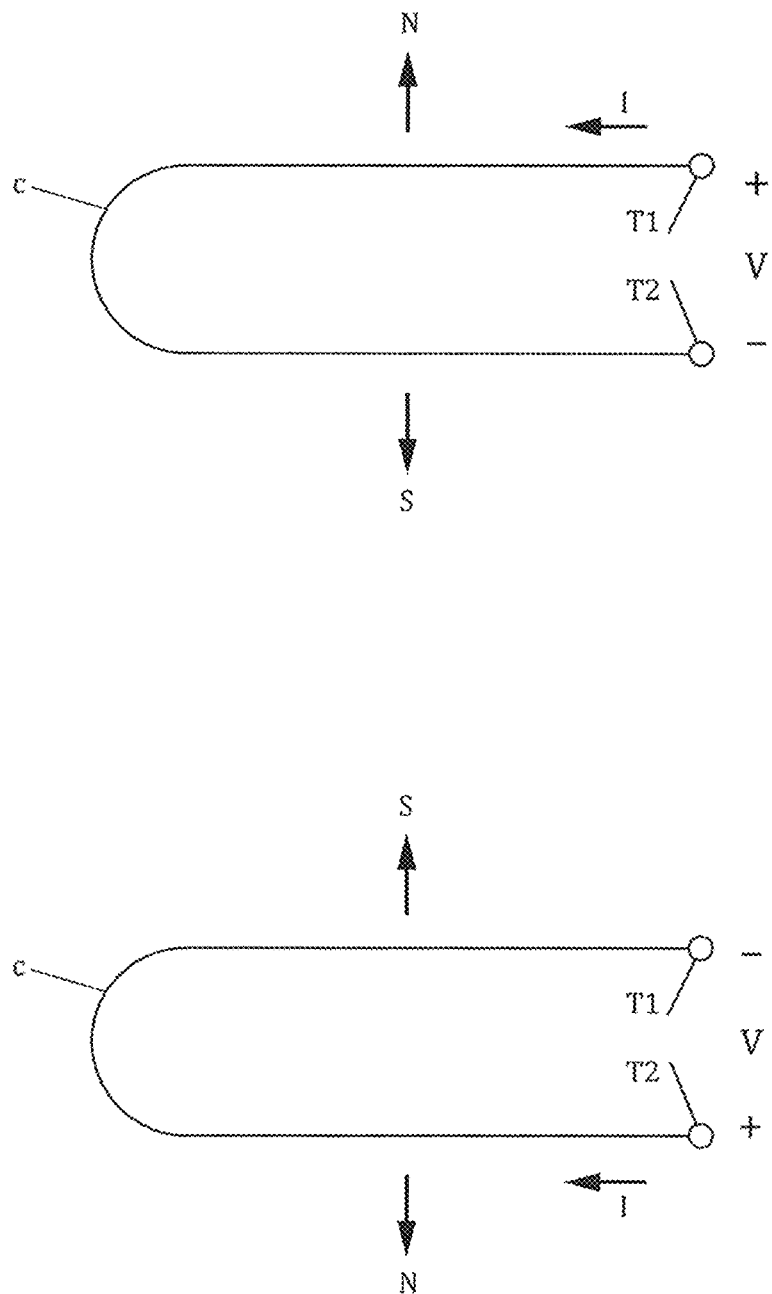
FIG. 3A depicts relationships between direct current (DC) flow and polarities of resulting magnetic fields.

Referring to FIG. 3A, in accordance with well-known scientific principles, magnetic fields may be generated at will. More particularly, for purposes of present exemplary embodiments, each forcer and thruster coil may be implemented as a coil C of multiple loops of an electrical conductor (e.g., insulated strands of metal wire) into which a control current I is applied to produce a voltage V on the coil. (The coil C here is depicted as a single loop for simplicity, but it will be readily appreciated that for producing stronger magnetic fields in practical applications multiple loops will be used.) This current I also produces a magnetic field having opposing north N and south S magnetic poles. As depicted here, reversing the polarity of the current I applied at the two terminals T1, T2 of the coil C causes a change in the direction of current I flow through the coil C, which, in turn, causes a reversal of the north N and south S magnetic poles. As discussed below, these principles are used advantageously by energizing the various forcer and thruster coils such that opposite poles (north N and south S) face each other when it is desired to create an attracting force to draw the coils together, and like poles (north N and north N, or south S and south S) face each other when it is desired to create a repelling force to cause the coils to repel one another.

Such control current I may be applied in various forms, including, without limitation, direct current (DC), amplitude modulation (AM), frequency modulation (FM), phase modulation (PM), pulse width modulation (PWM), pulse density modulation (PDM), pulse frequency modulation (PFM), phase shift keying (PSK), or frequency shift keying (FSK). In accordance with principles known in the art, the particular manner in which such control current I is generated or provided to the appropriate coil(s) may be dependent upon and/or otherwise suggested by various constraints imposed by the design and construction of the motor system or assembly as well as its operating characteristics or operating environment.

Figure 4:
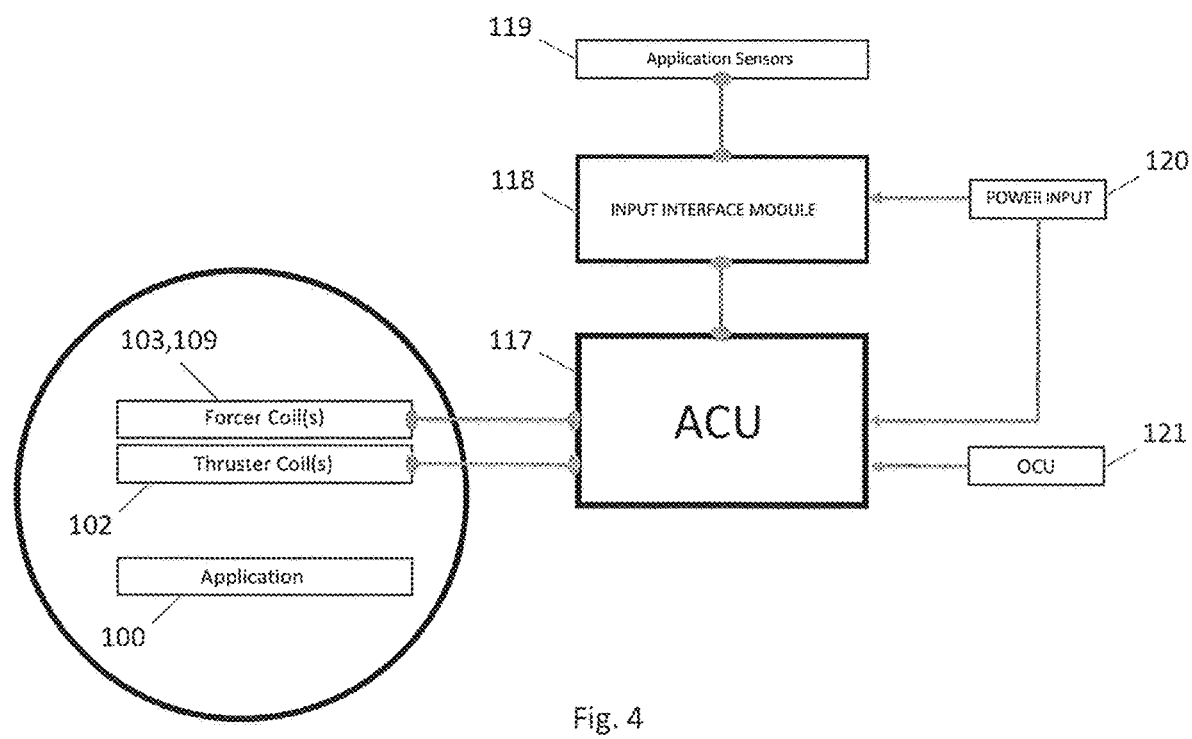
FIG. 4 is a block diagram of the components of a linear motor controller in accordance with exemplary embodiments.

Referring to FIG. 4, in accordance with exemplary embodiments, a linear motor as discussed herein may be applied to an ICE that uses an application control unit (ACU) 117 to control movement of the valve, with inputs to the ACU 117 from an overall control unit (OCU) 121 for the system in which the ICE is installed, e.g. an automobile, generator, truck, etc. In this application the linear motor shaft may be fixedly connected to the ICE valve shaft or the linear motor may be built around the valve stem. The data collected by the application sensor 119, may include without limitation, crankshaft position, engine speed, accelerator position and/or throttle command in a non-vehicular application, and input from the OCU 120 that may contain algorithms for the application and receive data from other sensors particular to the application, e.g., unless they are connected directly to the input interface module 118. The ACU 117 determines inputs from the application sensors 119 and OCU 121, when and how to drive the upper forcer coils 103, lower forcer coils 109 and thruster coil(s) 102, including appropriate voltages, polarities and durations. The additional coil sets shown in FIG. 2 (upper forcer 106 and thruster 105 coil, and lower forcer 108 and thruster 107 coil) may or may not be used in any given application. These additional coil sets, if used, may be driven by independent power supplies (not shown) controlled by the ACU 117. The ACU 117 may also send information from the Application Sensors 119 back to the OCU 121, depending on the application. The OCU 121 controls fuel and ignition for the ICE in this example. As noted above, the ACU 117 selectively energizes the coil assemblies 102, 103, 109 to cause the linear motor shaft 101 to move to a specific position at a specific time, with a specific speed and acceleration. Each of these parameters may be controlled independently for each valve and can also be altered during a single stroke and from one stroke to the next.

For example, the linear motor shaft 101 may be controllably slowed down (decelerated) just before the valve head 114 makes contact with the valve seat 115 so that it does not slam into the seat 115 with excessive force, which would be inefficient and potentially damaging to the valve. This cushioning effect may extend the life of the engine compared to valve assemblies that do not dampen such valve movement. Also, such dampening effect(s) may be achieved without need for springs or other mechanical devices, thereby minimizing complexity and overall cost of the valve train.

Figure 5:
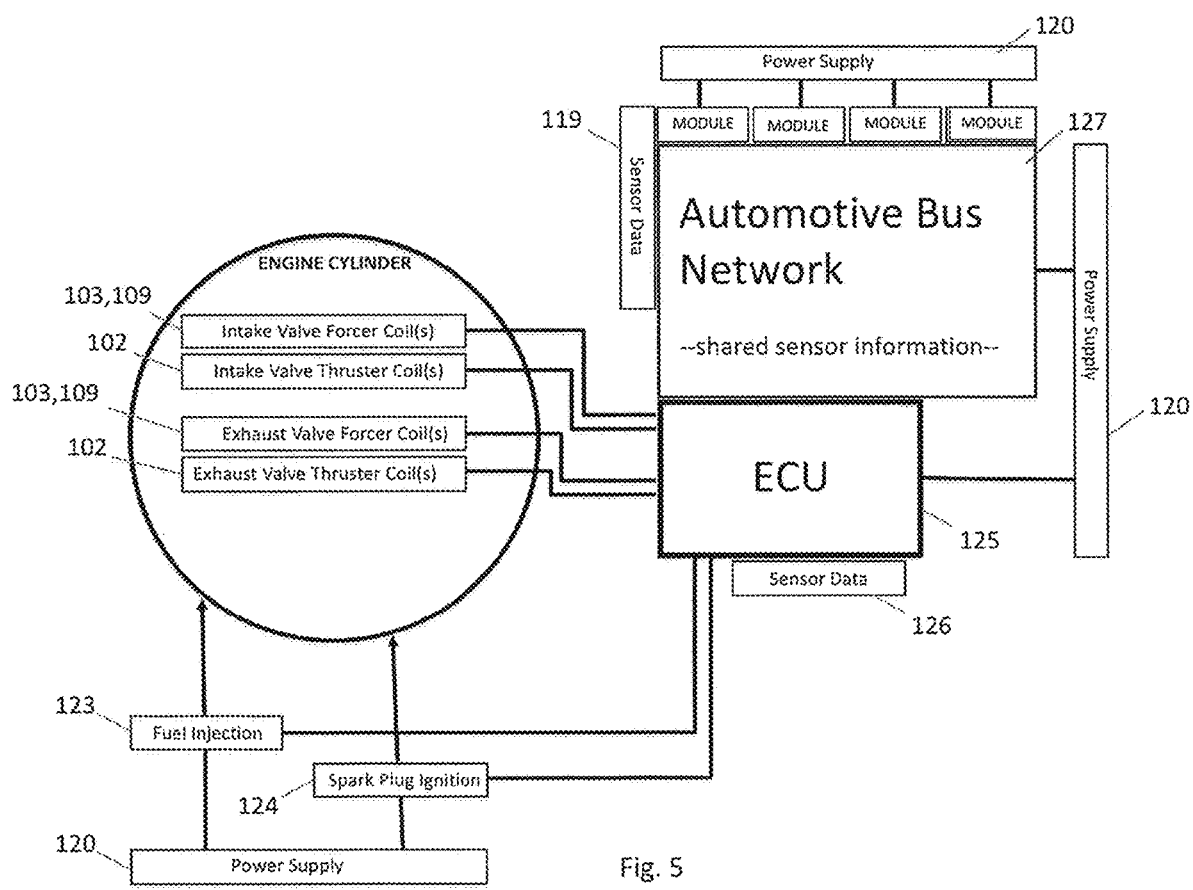
FIG. 5 is a block diagram of components of a controller for an internal combustion engine with valves operated by linear motors in accordance with exemplary embodiments.

Referring to FIG. 5, in accordance with exemplary embodiments, a linear motor as discussed herein may be applied to the valves of an ICE of a motor vehicle controlled by an engine control unit (ECU) 125, and connected to the bus network 127 of the vehicle. The ECU 125, which may include functionality of the ACU 117 and OCU 121 (FIG. 4), may receive sensor data 126 directly from the ICE and vehicle data from the application sensors 119 for the vehicle through the bus network 127, enabling the ECU 125 to control the ICE valve movements, fuel injection and ignition for desired performance. The motor vehicle may be an automobile, bus, truck, motorcycle, off-road vehicle such as tractor or all terrain vehicle, boat or aircraft. The ICE shown has one input valve and one exhaust valve, but multiple input and/or exhaust valves may be operated with the same control functions.

Figure 6:
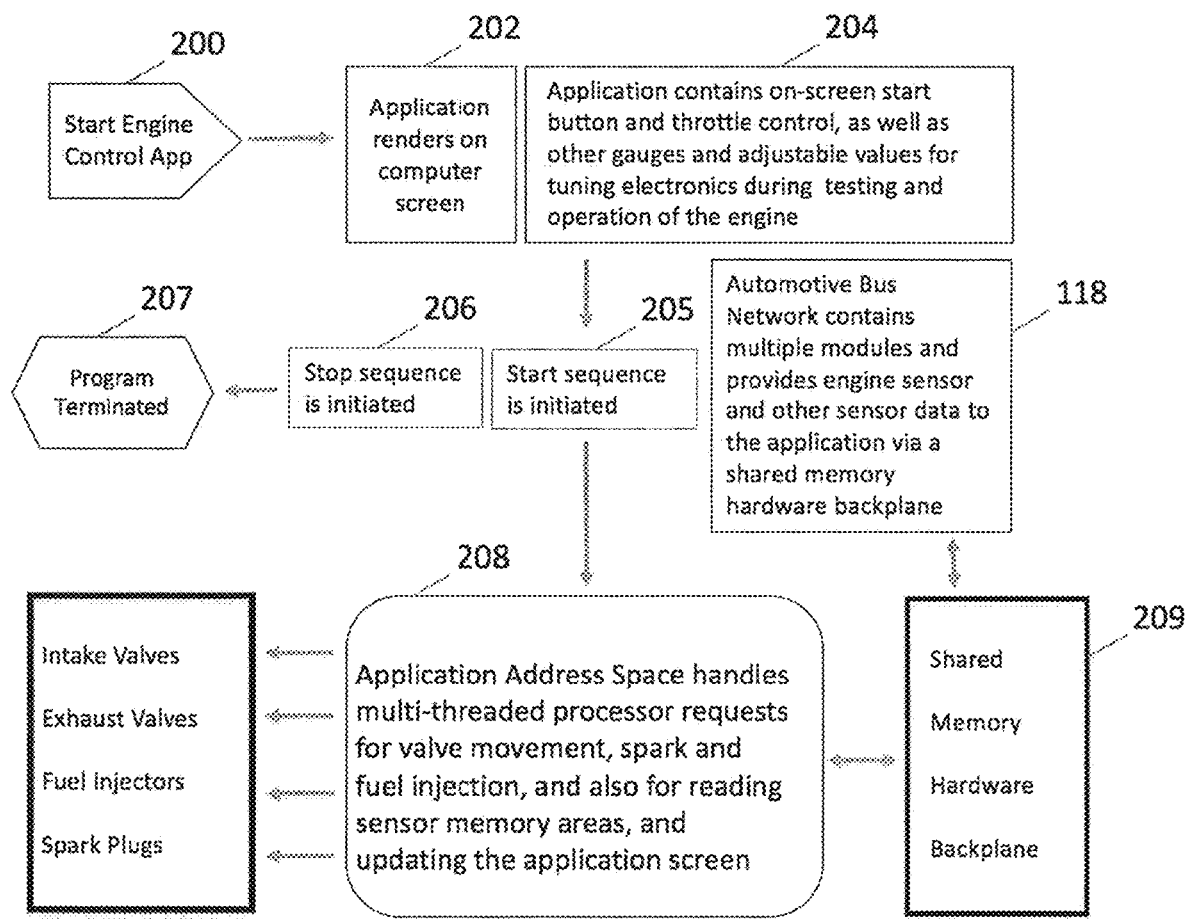
FIG. 6 is a block diagram of an engine start and stop sequence in accordance with exemplary embodiments.

Referring to FIG. 6, in accordance with exemplary embodiments, software program logic may be applied for a linear valve actuator system as discussed herein. This can be used by a manufacturer to alter vehicle ICE operating parameters through a graphical user interface in operative communication with the control system during initial design and programming. A diagnostic application 200 is first initiated. The application may be rendered on a graphical user interface 202 for interaction with the user, e.g., by presenting a plurality of buttons and gauges to the user 204, including start, throttle adjust and digital readouts of key operating parameters such as engine revolutions per minute (RPM).

A sensor hardware interface module 118 may be used, e.g., as depicted in FIG. 4, and connected to an appropriate processor and/or directly to the vehicle bus network 127 and from this bus to an appropriate processor. A sensor hardware interface module may collect the sensor data 126 and convert it to an appropriate format, if needed, for use by the processor when executing the program logic. Additional sensors from the vehicle or application may connect through the vehicle bus network 127.

Upon starting the ICE, the start engine control app 200 is initiated, the application performance update is looped to display 204, a firing sequence program 205 is launched in the application address space 208 and control schedules are retrieved from a shared memory hardware backplane 209 and the application address space processor(s) command the programmed valve operation, fuel delivery, ignition and engine crank to start. Turning the engine off causes the stop sequence 206 to be initiated, which directs the application address space to shut the engine down, and the application is terminated 207.

Figure 7:
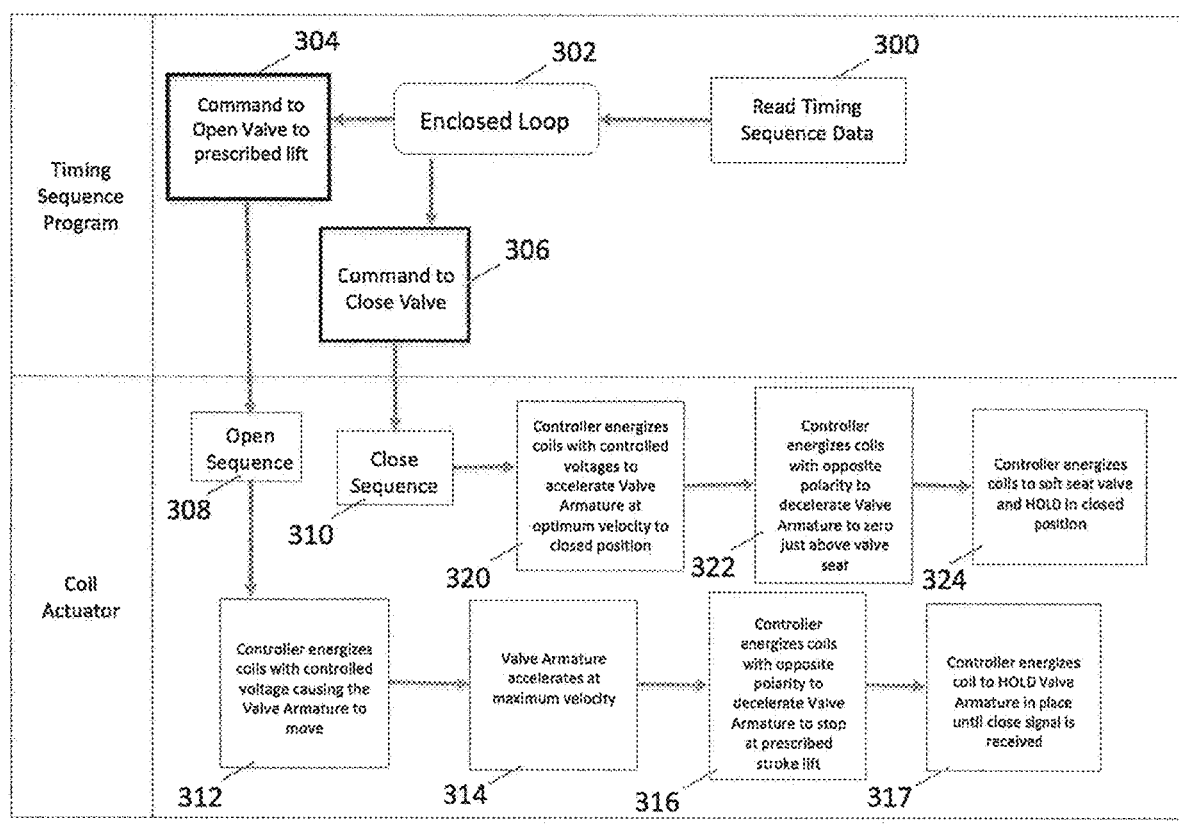
FIG. 7 is a block diagram of a valve opening and closing sequence in accordance with exemplary embodiments.

Referring to FIG. 7, the logic of an open/close sequence in accordance with exemplary embodiments may be applied to control movement of a valve in an ICE. This logic may be duplicated for each of the valves in a multi-valve implementation so that each valve can be controlled individually. The valve timing sequence data is read 300 and inputted into a closed control loop 302. The control loop may include commands to open the valve to a prescribed length or height 304 (often referred to as "lift") and a command to close the valve 306 after a predetermined duration. If the open valve command 304 is given to the linear motor, the open sequence 308 is followed by the linear motor. If the close valve command 306 is given to the linear motor, the close sequence 310 is followed by the linear motor.

In one example, in the open sequence 308, the controller energizes the coils with first controlled currents to accelerate the valve toward a predetermined open position at a first rate of acceleration 314. At a predetermined point of travel, the controller energizes the forcer coils with second currents having polarities opposing those of the first controlled currents to cause the valve to decelerate to zero at a position near the predetermined open position. The controller then energizes the forcer coils with third currents to lift the valve to and hold it in the predetermined open position ("lift") for a predetermined duration. In the close sequence 310, the controller energizes the forcer coils with fourth controlled currents to accelerate the valve toward the closed position at a second rate of acceleration 320. At a predetermined point of travel, the controller energizes the forcer coils with fifth currents having polarities opposing those of the fourth controlled currents to cause the valve to decelerate (e.g., to zero) at a position just above the valve seat 322. The controller then energizes the forcer coils with sixth currents to softly seat the valve against its seat and hold the valve in the seated position 324. Alternatively, the soft seating step 324 can be eliminated and the deceleration step 322 can be used to fully seat the valve, at which time the forcer coil currents polarities are switched to hold the valve in the closed position until an open command is received.

In accordance with exemplary embodiments, linear motor coils as discussed herein may be driven in different fashions to achieve desired actions. For example, in accordance with exemplary embodiments as depicted in FIG. 1, for an upward movement of the central shaft 101, the upper forcer coil 103 can be driven to attract the central shaft thruster coil 102. For greater power in this upward movement, the lower forcer coil 109 can be driven at the same time to repel the central shaft thruster coil 102. The currents in all three coils may be varied in polarity and magnitude to precisely manage the rate of movement of the central shaft 101, the distance it moves and then to stop the upward movement and hold the central shaft 101 in an any desired position. To increase the power applied, the central shaft thruster coil 102 may be implemented as multiple coils 102B, 102C (FIG. 1A) that may be driven together or separately to repel and attract the upper forcer coil 103 and lower forcer coil 109. In accordance with exemplary embodiments as depicted in FIG. 2, the additional hold open coils 107, 108, and hold closed coils 105, 106, may be energized as the central shaft 101 nears the fully open or fully closed positions, as the forcer coils 103, 109 and thruster coil(s) 102 are de-energized, to slow, softly stop and hold the central shaft 101 in the fully open or fully closed position. The terms "open" and "closed" are used only to denote full movement of the linear motor in alternate directions and have no other meaning here.

In accordance with exemplary embodiments, linear motor coils as discussed herein may be driven in a myriad of ways to achieve desired responsive actions, such as various acceleration and deceleration velocities or profiles, and/or motion vectors. For example, in accordance with exemplary embodiments related to FIGS. 2B though 2F, desired movements of a central shaft 101 may be achieved by driving a forcer coil 131 and a thruster coil 130 such that the coils 130, 131 alternately attract and repel each other to thereby cause the thruster coil 130 and central shaft 101 to move (e.g., slide) together within or otherwise relative to the fixed forcer coil 131 such that effective overlap of or distances between mutually adjacent or proximate portions of the coils 130, 131 becomes greater or less. For example, as discussed herein, voltages applied to the coils 130, 131 can be varied in polarity and magnitude to initiate and control movements and velocities of the shaft 101, and varied again to terminate and hold the shaft 101 in one or more desired positions, and then varied again to further initiate, control and terminate movements and velocities of the shaft 101 (e.g., in a reverse operation to return the shaft 101 to and hold it in its original position).

For example, in the open sequence 308, the computer or controller may energize the forcer coils with independent first forcer currents and the thruster coil(s) with independent first thruster currents to cause the valve (head to move in a direction away from the valve seat 312. The valve thus accelerates at an initial rate 314. At a predetermined point of travel, the computer or controller may energize the forcer coils with independent second currents having opposite polarities 316 to cause deceleration of the valve until the valve stops at a predetermined open position (stroke). The controller or computer may then energize the forcer coils with third independent currents to hold the valve in place until receiving a close signal 310. In this example, a linear motor as depicted in FIG. 2 may start with the central shaft in the maximum raised direction (closed) and would open by moving down in response to the energizing current(s). For example, this may be done by energizing the thruster coil 102 with a first independent current creating a first magnetic polarity in the thruster coil, while energizing the upper forcer coil 103 with its first independent current to its first magnetic polarity which is the same as the thruster's first polarity, thereby creating an opposing magnetic force between the fixed upper forcer coil and the thruster coil attached to the moving central shaft, and at the same time energizing the lower forcer coil 109 with a first independent current to a first magnetic polarity which is the opposite of the thruster's first polarity, thereby creating an attractive magnetic force between the stationary lower forcer coil and the thruster coil attached to the moving central shaft. As the central shaft nears the desired travel distance (stroke), the individual first currents in the upper and lower forcer coils may be reversed to independent second currents to slow and stop the central shaft, at which point the currents in the forcer coils and thruster coils may be changed again to individual third currents, as determined by the predetermined position of the thruster and central shaft, to hold the central shaft in place for the desired duration. At the end of the open duration, the coils may be energized with individual fourth currents so that the upper forcer coil attracts the thruster coil in an upward direction and the lower forcer coil repels the thruster coil, then reversing the forcer coil voltages to individual fifth currents to slow the central shaft near the fully up position, and finally energizing the forcer coils with individual sixth currents to softly seat the valve and hold it in the closed position.

Alternatively, if the linear motor is fitted with holding coils, the forcer coils 103 and 109 and thruster coil 102 may be de-energized and the holding coils 105, 106 individually energized with individual first currents to softly pull the central shaft into the fully up position and then energized with individual second currents to hold it there by individually energizing the coils to create opposite magnetic polarities in the coils and by varying the currents in the coils to adjust the attractive magnetic forces as the central shaft first softly moves to the closed position and then holds in that closed position. A linear motor as described herein may move any distance from very fractionally to the maximum stroke, then hold in that open position and then return to the original position, as commanded by the control system for the given application.

All comments above include single or multiple forcer coils, single or multiple thruster coils, and single or multiple hold-open and/or hold closed coil sets, if used, and apply to all embodiments.

Figure 8:
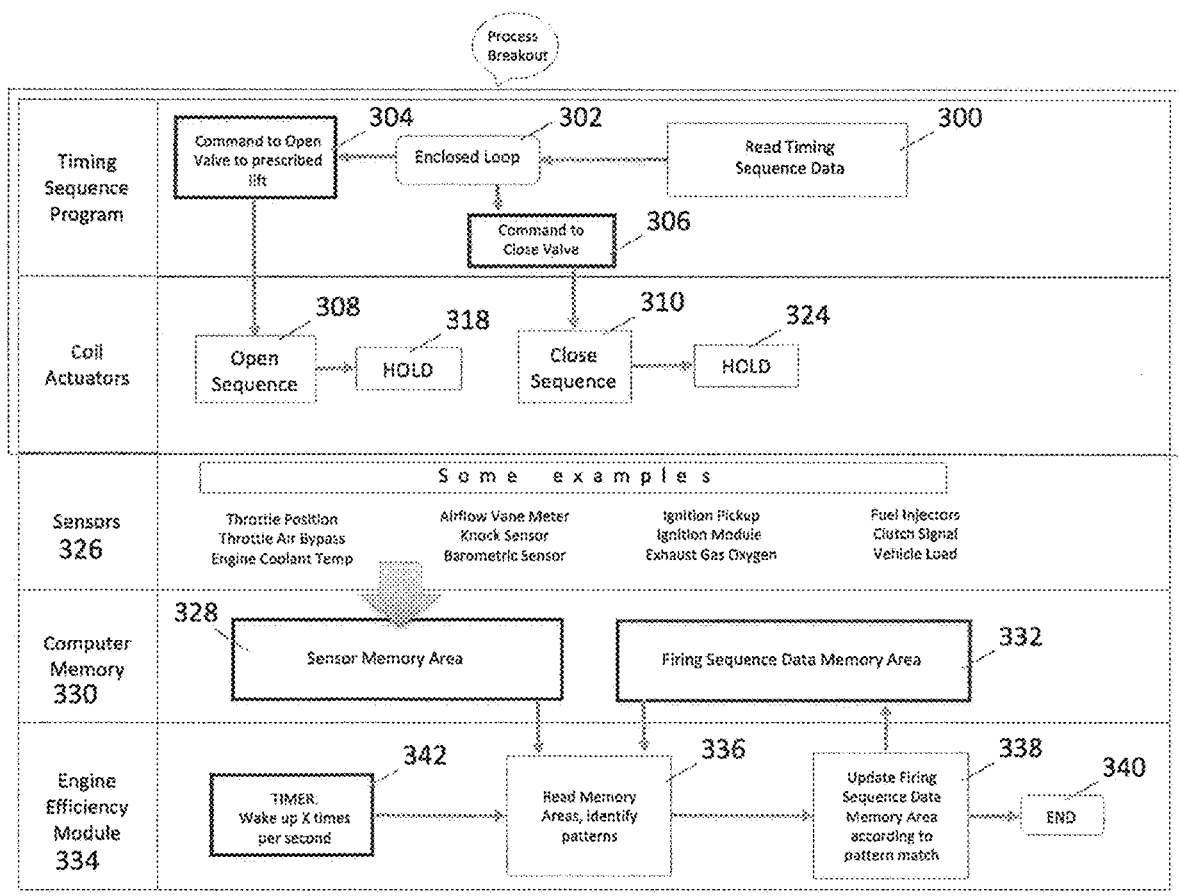
FIG. 8 is a block diagram of a valve operation in an engine in an automobile in accordance with exemplary embodiments.

Referring to FIG. 8, in accordance with further exemplary embodiments, a linear motor as discussed herein may be applied to the valves of an ICE and portions of the valve actuation process flow from the perspective of several components of an ICE management system, including the valve timing sequence program of the computer, the coil actuators, the sensors, memory and the engine efficiency module (which may be software stored in memory of the computer). The timing sequence program includes the previously-described steps of reading the timing sequence data 300, entering the closed loop sequence 302 to command the valve to open 304, as well as commanding the valve to close 306. The coil actuator logic operation includes the previously-described steps of the open sequence 308, holding the valve open 318, the close sequence 310 and holding the valve closed 324.

As the ICE operates, the plurality of sensors 326 (examples include: throttle position, engine speed (RPM), engine coolant temperature, exhaust gas oxygen level, intake airflow meter, knock sensors, barometric pressure sensors, clutch position sensor, transmission gear sensor, vehicle load, etc.) send their respective data to the sensor memory area 328 of the memory module 330 of the computer. The firing sequence data 332 is also stored in memory 330.

An engine efficiency module 334 or logic is also included in the computer or as part of a stand-alone module. This module can be formed as executable software code programmed in non-transitive memory that can be read and executed by a processor included in the computer. The engine efficiency module 334 includes the steps of reading from memory 336 some or all of the sensor data and the firing sequence data. Patterns in the retrieved data are identified and the firing sequence data are updated in the memory area 332 according to the data retrieval and pattern match step 336. The module 334 then ends 340 until woken up 342 periodically. The periodic wakeup signal can be provided by a timer responding to a set time period (e.g., several times per second) or every several revolutions of the crankshaft or every several clock cycles of the computer's processor. The system and logic described above provides for the control device that dynamically adjusts the timing and movement of the valves based upon a wide variety of operating conditions and variables. The engine efficiency module 334 may be continuously adjusted by the user of a motor vehicle, or by the application controller for a non-motor vehicle application, to maximize engine performance for economy, power, minimal emissions, or any combination of these as desired.

An ICE may also be operated in an open loop mode using multiple linear motors as discussed hereinabove with an operating speed, or frequency, determined by a controller, with a duration that may be a constant proportion (e.g., percentage) of the period of the operating frequency. The operating frequency (e.g., related to a rotational frequency of the host ICE) may be selected manually by an operator of the ICE. Such selected frequency may be maintained in accordance with signals from a crankshaft position sensor or other sensors provided to the ECU and programming the ECU to control the fuel delivery to maintain the desired operating frequency.

Using this system logic, valve position, velocity and acceleration of the central shaft can be varied both during a valve stroke and from one stroke to the next, as controlled by the logic programmed on a non-transitive memory of the electronic valve control computer.

While the invention has been described in connection with what is presently considered to be the most practical and preferred example embodiments, it will be apparent to those of ordinary skill in the art that the invention is not to be limited to the disclosed example embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. An apparatus including a linear motor, comprising:
   a shaft member having a longitudinal axis and opposing first and second shaft ends;
   at least one thruster coil disposed coaxially about and affixed to a portion of said shaft member between said opposing first and second shaft ends;
   at least one forcer coil disposed coaxially about another portion of said shaft member and outside an outer periphery of said thruster coil; and
   a gap between said thruster coil and said forcer coil.

2. The apparatus of claim 1, wherein said at least one forcer coil is disposed coaxially about at least a portion of said outer periphery of said thruster coil and defines said gap.

3. The apparatus of claim 1, further comprising a sleeve member disposed coaxially about at least a portion of said gap, wherein said at least one forcer coil is affixed to an outer periphery of said sleeve member.

4. The apparatus of claim 3, wherein said sleeve member comprises a ferrous sleeve.

5. The apparatus of claim 1, further comprising a housing, wherein:
   at least a portion of an outer periphery of said at least one forcer coil is attached to at least a portion of said housing;
   said housing includes opposing first and second housing portions having first and second apertures, respectively, disposed coaxially about said longitudinal axis; and
   said first and second shaft ends protrude from said housing via said first and second apertures, respectively.

6. The apparatus of claim 5, wherein said housing comprises a ferrous housing.

7. The apparatus of claim 1, further comprising one or more mechanical structures that include:
   a first portion to which said forcer coil is fixedly attached; and
   a second portion containing an aperture proximate one of said first and second shaft ends and adapted to movably guide longitudinal oscillation of said shaft member.

8. The apparatus of claim 1, further comprising:
   at least one electrical power source; and
   a power controller electrically coupled between said at least one electrical power source and said at least one forcer coil and said at least one thruster coil.

9. The apparatus of claim 1, wherein said shaft member comprises a stem of a poppet valve for an internal combustion engine.

10. The apparatus of claim 1, further comprising a mechanical coupling adapted to mechanically engage said shaft member with a stem of a poppet valve for an internal combustion engine.

11. An apparatus including a linear motor, comprising:
a shaft member having a longitudinal axis and opposing first and second shaft ends;
an open coil support member including
a first support portion disposed coaxially about at least a portion of said shaft member, and
a second support portion attached to said shaft member;
at least one thruster coil disposed coaxially about and affixed to said first support portion;
at least one forcer coil disposed coaxially about another portion of said shaft member and at least partially inside at least a portion of an inner periphery of said thruster coil; and
a gap between said thruster coil and said forcer coil.

12. The apparatus of claim 11, further comprising a vessel containing said at least one forcer coil.

13. The apparatus of claim 12, wherein said vessel comprises a ferrous vessel.

14. The apparatus of claim 11, wherein said second support portion is attached to said shaft member between said opposing first and second shaft ends.

15. The apparatus of claim 11, wherein said second support portion is attached to one of said first and second shaft ends.

16. The apparatus of claim 11, wherein, relative to second support portion, said at least one forcer coil comprises a proximal forcer coil portion and a distal forcer coil portion.

17. The apparatus of claim 11, wherein said at least one forcer coil is further disposed at least partially outside at least a portion of an outer periphery of said thruster coil.

18. The apparatus of claim 11, further comprising a housing that includes a portion with an aperture disposed coaxially about said longitudinal axis, wherein one of said first and second shaft ends protrude from said housing via said aperture.

19. The apparatus of claim 11, further comprising one or more mechanical structures that include a portion containing an aperture proximate one of said first and second shaft ends and adapted to movably guide longitudinal oscillation of said shaft member.

20. The apparatus of claim 11, further comprising:
at least one electrical power source; and
a power controller electrically coupled between said at least one electrical power source and said at least one forcer coil and said at least one thruster coil.

21. The apparatus of claim 11, wherein said shaft member comprises a stem of a poppet valve for an internal combustion engine.

22. The apparatus of claim 11, further comprising a mechanical coupling adapted to mechanically engage said shaft member with a stem of a poppet valve for an internal combustion engine.

23. A method for driving a linear motor, comprising:
applying, to at least one forcer coil disposed coaxially about at least a portion of a shaft member having a longitudinal axis and opposing first and second shaft ends, a first signal having one of first mutually opposing polarities to induce a forcer magnetic field; and
applying, to at least one thruster coil disposed coaxially with and between respective portions of said forcer coil and said shaft member, a second signal having one of second mutually opposing polarities to induce a thruster magnetic field, wherein said at least one thruster coil is affixed to a portion of said shaft member between said opposing first and second shaft ends and defines a gap coaxially between said thruster coil and said forcer coil;
wherein
responsive to applying said first and second signals having a combination of said first and second mutually opposing polarities, said forcer and thruster magnetic fields are mutually attractive and urge said shaft member to move more of said thruster coil between respective portions of said forcer coil and said shaft member, and
responsive to applying said first and second signals having a different combination of said first and second mutually opposing polarities, said forcer and thruster magnetic fields are mutually repellant and urge said shaft member to move more of said thruster coil out from between respective portions of said forcer coil and said shaft member.

24. The method of claim 23, further comprising guiding respective portions of said forcer and thruster magnetic fields with a ferrous sleeve member disposed circumferentially about at least a portion of said gap, wherein said at least one forcer coil is affixed to an outer periphery of said ferrous sleeve member.

25. The method of claim 23, further comprising guiding reciprocations of said first and second shaft ends with first and second apertures of opposing first and second portions, respectively, of a housing attached to at least a portion of an outer periphery of said at least one forcer coil.

26. The method of claim 23, further comprising movably guiding longitudinal oscillation of one of said first and second shaft ends with an aperture of one of opposing first and second portions, respectively, of a housing attached to at least a portion of an outer periphery of said at least one forcer coil.

27. The method of claim 23, further comprising causing, with said shaft member, a poppet valve for an internal combustion engine to open and close.

28. The method of claim 23, further comprising mechanically engaging said shaft member with a stem of a poppet valve for an internal combustion engine.

29. A method for driving a linear motor, comprising:
applying, to at least one forcer coil disposed coaxially about at least a portion of a shaft member that includes a longitudinal axis and opposing first and second shaft ends and is attached to a first support portion of an open coil support member, a first signal having one of first mutually opposing polarities to induce a forcer magnetic field; and
applying, to at least one thruster coil disposed coaxially about and affixed to a second support portion of said open coil support member and disposed coaxially about at least another portion of said shaft member, a second signal having one of second mutually opposing polarities to induce a thruster magnetic field, wherein said at least one forcer coil is further disposed at least partially inside at least a portion of an inner periphery of said thruster coil;
wherein
responsive to applying said first and second signals having a combination of said first and second mutually opposing polarities, said forcer and thruster magnetic fields are mutually attractive and urge said shaft member to cause more of said at least one forcer coil to be disposed inside said inner periphery of said thruster coil, and
responsive to applying said first and second signals having a different combination of said first and second mutually opposing polarities, said forcer and thruster magnetic fields are mutually repellant and urge said shaft member to cause less of said at least one forcer coil to be disposed inside said inner periphery of said thruster coil.

30. The method of claim 29, further comprising guiding respective portions of said forcer and thruster magnetic fields with a ferrous vessel containing said at least one forcer coil.

31. The method of claim 29, wherein said first support portion is attached to said shaft member between said opposing first and second shaft ends.

32. The method of claim 29, wherein said first support portion is attached to one of said first and second shaft ends.

33. The method of claim 29, wherein, relative to first support portion, said at least one forcer coil comprises a proximal forcer coil portion and a distal forcer coil portion.

34. The method of claim 29, wherein said at least one forcer coil is further disposed at least partially outside at least a portion of an outer periphery of said thruster coil.

35. The method of claim 29, further comprising movably guiding longitudinal oscillation of one of said first and second shaft ends with an aperture of a housing disposed coaxially about said longitudinal axis.

36. The method of claim 29, further comprising movably guiding longitudinal oscillation of one of said first and second shaft ends with an aperture of a mechanical structure disposed proximate said one of said first and second shaft ends.

37. The method of claim 29, further comprising causing, with said shaft member, a poppet valve for an internal combustion engine to open and close.

38. The method of claim 29, further comprising mechanically engaging said shaft member with a stem of a poppet valve for an internal combustion engine.

* * * * *

UNITED STATES PATENT AND TRADEMARK OFFICE
CERTIFICATE OF CORRECTION

| | |
|---|---|
| PATENT NO. | : 10,601,293 B2 |
| APPLICATION NO. | : 16/370576 |
| DATED | : March 24, 2020 |
| INVENTOR(S) | : Richard H. Hutchins et al. |

It is certified that error appears in the above-identified patent and that said Letters Patent is hereby corrected as shown below:

On the Title Page

In Item (72), the listing of inventors should be as follows:
-- Richard H. Hutchins, South San Francisco, CA (US); Joseph Scott Rust, Los Gatos, CA (US); Dallas Perkins, Ponder, TX (US); Hesan Vahedi, Escondido, CA (US); David Gonsoulin, San Diego, CA (US); Christopher Edrington, Anderson, SC (US) --

Signed and Sealed this
Second Day of January, 2024

Katherine Kelly Vidal
*Director of the United States Patent and Trademark Office*